United States Patent Office 3,287,320
Patented Nov. 22, 1966

3,287,320
SPIROBI(META-DIOXANE) POLYESTER RESINS
Robert E. Leech and Julian K. Rose, South Charleston, W. Va., assignors to Union Carbide Corporation, a corporation of New York
No Drawing. Filed July 18, 1958, Ser. No. 749,323
10 Claims. (Cl. 260—75)

This invention relates to a novel class of synthetic resinous polyesters which in general are rubbery solids and adapted upon simple heat treatment to yield tough, hard, shaped articles such as films, sheets and molded forms which are insoluble in common solvents such as water, acetone, ethanol, benzene, toluene, diethyl ether, pentane, hexane, cyclohexane, and are infusible. The invention also concerns a process for the production of such novel polyesters by conducting a condensation reaction between (1) a member of the class consisting of the alkanediols having the structure $C_mH_{2m}(OH)_2$ where $m$ is an integer from 2 to 10 and the polyoxyalkylenediols of the structure $HOCH_2CHR^3(OCH_2CHR^3)_pOH$ where $R^3$ is hydrogen or a methyl group and $p$ is an integer from 1 to 3; and (2) a spirobi(meta-dioxane) diester or diacid having a structure represented by the formula:

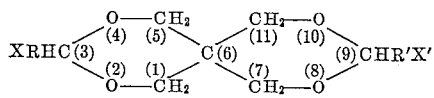

wherein R and R', respectively, designates a member of the class consisting of the divalent aliphatic radicals of the formula $C_nH_{2n}$ wherein $n$ is an integer of from 2 to 18 and the divalent cyclohexane residue; and X and X', respectively, designates a member of the class consisting of the —COOH and —COOR² radicals wherein R² designates a member of the class consisting of the alkyl radicals having one to fourteen carbon atoms. The resultant ester product subsequently is polymerized in the presence of catalytic amounts of a polymerization catalyst such as hereinafter described.

The novel resinous polyesters of this invention are rubbery to semi-rigid solids in bulk. They yield tough flexible films when shaped and heat-cured as hereinafter described. Solutions of the polyesters in organic solvents are useful coating and impregnating compositions, yielding protective coatings which adhere firmly and readily can be rendered infusible and insoluble in substantially all of the common organic solvents. The products are colorless to light yellow, depending upon the purity of the starting materials.

The novel, at least partially cross-linked resinous polymers of the invention can be made, according to a preferred modification thereof, by reacting (1) a member of the class consisting of alkanediols having the structure $C_mH_{2m}(OH)_2$ where $m$ is an integer from 2 to 10 and the polyoxyalkylenediols of the structure $$HOCH_2CHR^3(OCH_2CHR^3)_pOH$$

where $R^3$ is hydrogen or a methyl group, and $p$ is an integer from 1 to 3; and (2) a spirobi(meta-dioxane) diester or diacid of the structure:

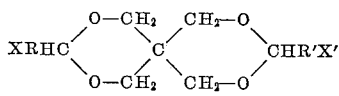

wherein R, R', X, X' have the meanings hereinbefore indicated, in a complex condensation and polyesterification reaction employing from about one to five moles of the diol per mole of the said spirobi(meta-dioxane) diester, and preferably a molar ratio of around 1:1 to 1.5:1 at temperatures within the range from about 125° C. to about 225° C. and preferably from 150° C. to 175° C. When a spirobi(meta-dioxane) diacid is one of the reactants any of the well-known acidic polyesterification catalysts can be used, such as sulfuric acid, diethyl sulfate, methanesulfonic acid, toluenesulfonic acid, zinc chloride, and the perfluoroalkanoic acids. The reaction of a spirobi(meta-dioxane) diester with the diol is catalyzed by any of the usual ester exchange catalysts, such as the foregoing and the tetraalkyl titanates, dialkyl phosphates, litharge, alkali metal alcoholates and hydroxides, alkaline earth metal oxides, antimony trioxide, boron trifluoride, cadmium, magnesium and zinc salts of alkanoic acids such as acetic and propanoic acids, and metals such as lithium, potassium, sodium, magnesium, zinc, cadmium, aluminum, manganese, iron, nickel, and the like.

The tetra lower alkyl titanates are outstandingly effective as ester exchange catalysts. The catalyst can be used effectively in concentrations of 0.01 percent to 5.0 percent by weight based on the total weight of reactants, although concentrations of catalyst of from about 0.1 percent to around 0.5 percent by weight are preferred. The initial condensation or polyesterification reaction is conducted in an essentially oxygen-free atmosphere of gas which is inert to the reaction conditions such as nitrogen, carbon dioxide, methane, helium, argon, or mixtures of these gases, and the by-product water (when using a diacid reactant) or the by-product alkanol (when using a diester reacant) preferably is removed by sparging with an inert gas, at atmospheric or other pressure.

This initial polyesterification or condensation stage is terminated when substantially all of the by-product alkanol (or water in the case where a diacid reactant is used), together with most of any excess diol reactant, preferably around 90 percent of the excess, has been removed during the nitrogen sparging operation. Usually this point can be determined visually by a marked increase in the viscosity of the reaction mixture. The precise limits of viscosity change varies from one reaction mixture to another.

The intermediate products from the initial condensation or polyesterification reaction are viscous clear liquids which are soluble in such common organic solvents as ethyl acetate, diethyl ether, dioxane, benzene, acetone and other ketones, and carbon tetrachloride. They are insoluble in water and in aliphatic hydrocarbons such as pentane, hexane, heptane and cyclohexane. Solutions of these products are useful in the preparation of protective coatings by dipping or spraying, and when thus applied to a surface the film thus formed, upon removal of the solvent, is readily heat-cured and the film made infusible and insoluble in all of the common solvents.

The conversion of the intermediate products to the organic solvent-insoluble and infusible form can, in general, be effected by heating the former to temperatures within the range from around 125° C. to 275° C. under conditions favoring polymerization of the intermediate product. This phase of the process conveniently can be carried out under vacuum at lower temperatures for the elimination of the excess diol.

When the intermediate product to be converted is in the form of a film, sheet, layer, filament, or other article that is relatively thin in at least one of its dimensions conversion temperatures around 125° C. to 175° C. are commonly used. The higher conversion temperatures up to 275° C. are useful when treating an unshaped large mass of the intermediate product. In that case the resultant mass of cross-linked resin can be pulverized, converted to a gel by grinding with swelling agents or semi-solvents such as dimethylformamide, butyl "Carbitol," and the acetate ester of β-ethoxyethanol. The gel can be applied to paper or a textile fabric in a calendering process to yield an adherent coating useful in the manufacture of laminated articles.

The final cross-linking stage in general is complete when the shaped article or the bulk product is free from tackiness and, in the case of the cooled film, has a relatively hard, firm surface. The products are solid cross-linked infusible resins which are insoluble in water and in such common solvents as benzene, toluene, acetone, methyl ethyl ketone and other ketones, diethyl ether, dibutyl ether, dioxane and other ethers, and in aliphatic hydrocarbons. The products are softened by the acetate and propionate esters of β-ethoxyethanol, β-methoxyethanol, β-ethoxy-(2-ethoxy)ethanol, β-butoxy-(2-ethoxy)ethanol, and by dimethylformamide and nitrobenzene.

While no additional curing catalyst is required in the final or curing step, such acidic and basic catalysts as didecyl phosphoric acid, methanesulfonic acid, diethyl sulfate, sulfuric acid, p-toluenesulfonic acid, zinc chloride, trifluoroacetic acid, boron trifluoride, piperidine and sodium hydroxide can be used in concentrations between 0.005 percent and 2 percent by weight based on the total weight of polymer and preferably between 0.05 percent and 0.5 percent by weight. Acidic catalysts are preferred.

While the description herein is more particularly directed to the use as reactant of di-primary alkanediols due to their ease of esterification, either primary-secondary and di-secondary alkanediols, either branched chain or straight chain, can be used effectively. Among such diols are 1,2-ethanediol; 1,2-propanediol; 1,3-butanediol; 1,4-butanediol; 2,4-pentanediol; 3-methyl-1,5-pentanediol; 1,3-hexanediol; 1,6-hexanediol; and 1,10-decanediol. Polyalkylene glycols also can be used, such as diethylene glycol, triethylene glycol, tetraethylene glycol, dipropylene glycol, tripropylene glycol, and the like.

It is not positively established whether the novel cross-linked polyesters or polymers of the invention are produced by the cracking of acetal groups in the low molecular weight polymer followed by interaction between polymer chains such as esterification of the hydroxyl group, or by addition of the hydroxyl across a double bond created by the same acetal-cracking reaction occurring in a different chain, or by the bridging between polymer chains by an alcohol-exchange reaction between the excess diol and two adjacent polymer chains, or by some other reaction.

These polymers do not have the discoloration typical of resinous products resulting from the thermal degradation occurring in the reaction or distillation of many organic compounds.

The production of these cross-linked polymers by the process described was quite unexpected since it had appeared evident that linear polymers only would be produced from these reactants.

The spirobi(meta-dioxane) diesters and diacids used as starting materials in the process of this invention can be made by heating and condensing, in a reaction medium or diluent inert to the reactants, at temperatures within the range from 50° C. to about 150° C. in the presence of an acidic catalyst such as sulfuric acid, a β, γ, or δ-formyl alkanoic ester or mixtures thereof and pentaerythritol, neutralizing the resultant reaction mixture, filtering the neutralized mixture, and stripping the resultant filtrate of diluent and any unreacted formyl compound under high vacuum. The formyl alkanoic ester and the pentaerythritol can be reacted in a molar ratio range between 2 to 1 and 5 or more to 1, although a molar ratio around 2.2 to 1 is generally preferred.

Formyl alkanoic esters useful in that process include those having structures

wherein R designates a divalent aliphatic radical of the formula $C_nH_{2n}$ having two to eighteen carbon atoms, and X designates a member of the class consisting of the —COOR² radicals wherein R² designates a member of the class consisting of the alkyl groups having one to fourteen carbon atoms.

The diacid reactants used in the process of this invention are readily prepared from the corresponding diesters described above by saponifying the latter with water in the presence of an alkaline reagent such as sodium hydroxide, in a diluent such as methanol, at temperatures in the range from about 20° C. to about 100° C. The reaction mixture then is neutralized with a mineral acid such as sulfuric acid or hydrochloric acid; and the neutralized reaction mixture is filtered, and the insoluble diacid product is washed with water and dried.

The spirobi(meta-dioxane) diesters and diacids used as starting materials in the present invention, and methods for their production, are disclosed in our pending application Serial No. 705,757, filed December 30, 1957 now Patent Number 2,996,517.

The following examples serve to illustrate the invention and are not intended to limit the scope thereof.

*Example 1*

A mixture of the diacid, 3,9-bis(carboxypropyl)-2,4,8,10-tetraoxaspiro(5.5)hendecane (25 grams, 0.075 mole), ethylene glycol (18.7 grams, 0.302 mole), perfluorocaprylic acid (0.2 gram), and tetraisopropyl titanate (0.04 gram) was reacted for 1.5 hours with nitrogen sparging in a glass reaction vessel having a sintered glass filter at the bottom through which nitrogen was admitted. During this time the temperature was raised from 150° C. to 200° C. and then was raised during an additional three hours to 200° C. to 225° C. Water was condensed out of the off-gas stream while heating at 150° C. to 200° C.; during the ensuing three hours at 200° C. to 225° C., 12.5 grams of ethylene glycol, amounting to about 90 percent of the excess was collected as condensate. Glass strips were then coated with the viscous reaction product and heated in a vacuum oven for one hour at 100° C. and for one hour at 225° C. at a pressure of one millimeter of mercury. The resultant clear, transparent film was very tough and could only be removed from the glass by shaving with a knife. It softened slightly at 240° C. but did not melt. It did not dissolve when heated on the steam bath with the following solvents: acetone, benzene, chloroform, o-dichlorobenzene, dioxane, diethyl ether, ethylene glycol, methanol, β-methoxyethanol, pyridine, toluene, ethyl acetoacetate, monochlorobenzene, nitrobenzene and water.

*Example 2*

A charge of the same reactants in the same proportions described in Example 1 was heated with nitrogen sparging and stirring for 1.5 hours at 150° C. to 200° C., and for 1.25 hours at 200° C. to 225° C. Water was condensed out of the off-gas stream while heating at 150° C. to 200° C.; during the ensuing 1.25 hours at 200° C. to 225° C., 12.5 grams of ethylene glycol amounting to about 90 percent of the excess was collected as condensate. The viscous melt was dissolved in benzene and the resultant solution was used to coat heavy aluminum foil. The coated foil was heated for three hours at 225° C. in a vacuum oven. The resulting clear film adhered firmly to the foil and did not crack or peel away when the foil was flexed at room temperature. It did not melt at 300° C.

*Example 3*

The diester 3,9-bis(carbethoxyethyl)-2,4,8,10-tetraoxaspiro(5.5)hendecane (18 grams, 0.05 mole, was charged into the reactor described in Example 1 with 6.5 grams (0.055 mole) of 3-methyl-1,5-pentanediol, and 0.024 gram of tetrabutyl titanate, and the mixture was heated for five hours at 175° C. while blowing nitrogen therethrough. Evolution of by-product ethanol ceased after five hours at which point 4.6 grams, the full theoretical amount, had been collected, and the reaction was stopped. The polymeric product was a slightly yellow viscous liquid soluble in acetone. A 50 percent solution thereof in acetone was cured in a flat glass dish at 125° C. for twenty hours yielding a hard, light amber film that exhibited excellent adhesion to the glass surface upon removal of the solvent. It was resistant to attack by many organic solvents such as benzene, toluene, acetone, methyl ethyl ketone, dibutyl ether, dioxane, hexane, cyclohexane, ethanol, and 2-propanol.

Example 4

Following the general procedure described in Example 3, 18 grams (0.05 mole) of 3,9-bis(carbethoxyethyl)-2,4,8,10-tetraoxaspiro(5.5)hendecane, and 5.2 grams (0.055 mole) of 2,4-pentanediol, were reacted in the presence of 0.023 gram of tetrabutyl titanate for five hours at 175° C. at 760 millimeters pressure, and for five additional hours at 175° C. and 100 millimeters of mercury. During the reaction 4.6 grams, the theoretical amount of co-product ethanol, was collected. The resultant viscous polymer was dissolved in acetone, the solution cast as a film on glass and cured for twenty hours at 125° C. The cured film was hard, very clear, and exhibited excellent adhesion to the glass surface. It was resistant to attack by such solvents as benzene, toluene, acetone, methyl ethyl ketone, dibutyl ether, dioxane, hexane, cyclohexane, ethanol, and 2-propanol.

Example 5

The diester 3,9-bis(carbethoxyethyl)-2,4,8,10-tetraoxaspiro(5.5)hendecane (18.0 grams, 0.050 mole), diethylene glycol (3.4 grams, 0.055 mole), and 0.22 gram of tetrabutyl titanate were charged to a tubular glass reaction vessel constructed with a sintered glass filter at the bottom through which nitrogen was introduced. The reaction vessel was immersed in a hot oil bath and was heated for six hours at 175° C. while blowing nitrogen through the molten contents. At this point 4.6 grams, the theoretical amount of co-product ethanol, had been collected and the polymer, at 175° C. had about the viscosity of honey at room temperature, indicating a relatively high degree of linear polymer formation. After cooling to below 80° C. benzene (25 milliliters) was added to the polymer to thin it to a desirable consistency for casting, and methanesulfonic acid (0.04 gram) was added as a curing catalyst. The benzene solution was cast onto flat glass plates, and after evaporation of most of the volatile solvent the films were cured in a circulating air oven at 150° C. After six hours they had cured to a tack-free condition. The films were tough and clear, with little or no color and adhered well to the glass surface. They resisted attack by many organic solvents such as benzene, toluene, acetone, methyl ethyl ketone, dibutyl ether, dioxane, hexane, cyclohexane, ethanol and 2-propanol.

Example 6

The diester 3,9-bis(carbmethoxyheptadecyl)2,4,8,10-tetraoxaspiro(5.5)hendecane (37.7 grams, 0.05 mole) was charged with 3.4 grams (0.055 mole) of ethylene glycol and 0.04 gram of tetrabutyltitanate into a reactor similar to that described in Example 1 and was reacted at 175° C. for twenty-four hours with nitrogen sparging. During the reaction 3.2 grams, the theoretical amount of the co-product methanol, was collected. The resultant viscous polymer was cast onto glass plates and cured thereon for nine hours at 150° C. yielding an elastic rubbery coating which adhered well to the glass and was resistant to attack by such solvents as acetone, ethanol, 2-propanol and dibutyl ether.

Example 7

Following the general procedure and using apparatus described in Example 3 a mixture of 18 grams (0.05 mole) of 3,9-bis(carbethoxyethyl)-2,4,8,10-tetraoxaspiro(5.5)hendecane, 6.5 grams (0.055 mole) of 1,6-hexanediol, and 0.024 gram of tetrabutyl titanate was reacted for 2.25 hours at 175° C. During the reaction period 4.6 grams, the theoretical amount of co-product ethanol, was collected. The resulting clear viscous polymer was dissolved in acetone to form a 50 percent solution. A film cast from such solution, upon curing for two hours on glass at 125° C. yielded a hard, light amber coating that exhibited excellent adhesion to the glass and was resistant to attack by such solvents as benzene, toluene, acetone, methyl ethyl ketone, dibutyl ether, dioxane, hexane, cyclohexane, ethanol and 2-propanol.

Example 8

A mixture of 19.4 grams (0.05 mole) of 3,9-bis(carbethoxypropyl)-2,4,8,10-tetraoxaspiro(5.5)hendecane, 3.4 grams (0.055 mole) of ethylene glycol, and 0.02 gram of tetrabutyl titanate were heated and reacted at 175° C. for five hours with nitrogen sparging until there was no further evolution of ethanol. 4.6 grams of ethanol were collected. After cooling the polymeric product was dissolved in 25 milliliters of ethanol, and 0.04 gram of methanesulfonic acid was added as a curing catalyst. The solution of polymer was cast onto glass plates, the solvent evaporated at room temperature, and the films cured at 175° C. in a circulating air oven for four hours. The resultant films were tough, free from tackiness, and adhered tenaciously to the glass. They resisted attack by such organic solvents as benzene, toluene, acetone, methyl ethyl ketone, dibutyl ether, dioxane, hexane, cyclohexane, ethanol, and 2-propanol.

Example 9

Using apparatus of the type described in Example 5, a mixture of 22.3 grams (0.054 mole) of 3,9-bis(carboxycyclohexyl)-2,4,8,10-tetraoxaspiro(5.5)hendecane, 10 grams (0.162 mole) of ethylene glycol, 0.16 gram of perfluorocaprylic acid and 0.04 gram of litharge was reacted for 4.5 hours at 175° C., at which time the evolution of the co-product water ceased. The reaction mixture was heated to 225° C. to remove overhead the excess diol. 1.9 grams of water and 6 grams of ethylene glycol were collected as condensate during the reaction. In two hours at 225° C. a condensate was collected equivalent to 90 percent of the excess glycol present. The resultant polymeric product, which was glassy solid at room temperature, was dissolved in 25 milliliters of benzene and the resultant solution was cast onto glass plates. After evaporation of the solvent the films were cured by heating in a circulating air oven at 150° C. during eight hours. The cured films were tough and transparent, and showed excellent adhesion to the glass. They resisted attack by such solvents as benzene, toluene, acetone, methyl ethyl ketone, dibutyl ether, dioxane, hexane, cyclohexane, ethanol, and 2-propanol.

Example 10

Using apparatus of the type described in Example 5, a mixture of 26 grams (0.105 mole) of 3,9-bis(carboxy)-2,4,8,10-tetraoxaspiro(5.5)hendecane, 7.16 grams (0.115 mole) of ethylene glycol and 0.03 gram of tetrabutyl titanate was reacted for 1.5 hours at from 150° C. to 180° C. Sparging with nitrogen removed 3.4 grams of water from the reaction mixture. The resultant viscous polymeric product was dissolved in ethanol and cast onto glass plates. After evaporation of the solvent the films were cured by heating for three hours at 125° C. The cured films had good color, were tack free, and adhered well to the glass. They resisted attack by such organic solvents as acetone, ethanol, 2-propanol, and dibutyl ether.

Example 11

A mixture of 19.4 grams (0.05 mole) of 3,9-bis(1,1-dimethyl-3-carboxypropyl) - 2,4,8,10 - tetraoxaspiro(5.5) hendecane, and 3.4 grams (0.055 mole) of ethylene glycol was heated for 2.5 hours at 200° C. while being sparged

What is claimed is:

1. Process for the production of resinous cross-linked polyesters which comprises forming a polyester intermediate characterized by solubility in benzene, acetone, and dioxane by heating and condensing at temperatures within the range between about 125° C. and 275° C. in an inert atmosphere (1) a spirobi(meta-dioxane) compound having the structure:

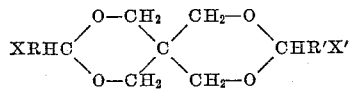

wherein R and R' are members of the class consisting of the divalent aliphatic radicals of the formula $C_nH_{2n}$ wherein $n$ is an integer from 2 to 18, and the divalent cyclohexane group; and X and X' are —$COOR^2$ radicals wherein $R^2$ designates a member of the class consisting of hydrogen and the alkyl radicals having one to fourteen carbon atoms; and (2) a member of the class consisting of the alkanediols of the structure $C_mH_{2m}(OH)_2$ where $m$ is an integer from 2 to 10 and the polyoxylalkylene diols of the structure $$HOCH_2CHR^3(OCH_2CHR^3)_pOH$$

where $R^3$ is of the class consisting of hydrogen and the methyl radical, and $p$ is an integrer from 1 to 3; the said diol and spirobi(meta-dioxane) compound being reacted in the range of molar ratios of from 1:1 to 5:1, said diol having a boiling point higher than that of by-product $R^2OH$, removing the by-product $R^2OH$ as formed and discontinuing the condensation when substantially all formation and evolution of the $R^2OH$ has ceased, and thereafter cross-linking said intermediate polyester by heating said polyester to temperatures of from about 125° C. to 275° C. thereby forming a resinous cross-linked polyester characterized by insolubility in benzene, acetone and dioxane.

2. Process for the production of resinous cross-linked polyesters, which comprises forming a polyester intermediate characterized by solubility in benzene, acetone, and dioxane by heating and condensing at temperatures within the range between about 125° C. and 275° C. (1) a spirobi(meta-dioxane) compound having the structure:

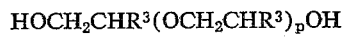

wherein R and R' are members of the class consisting of the divalent aliphatic radicals of the formula $C_nH_{2n}$ wherein $n$ is an integer from 2 to 18, and the divalent cyclohexane group; and X and X' are —$COOR^2$ radicals wherein $R^2$ designates a member of the class consisting of hydrogen and the alkyl radicals having one to fourteen carbon atoms; and (2) an alkanediol having two to ten carbon atoms and having two primary hydroxyl radicals, the said diol and spirobi(meta-dioxane) compound being reacted in the molar ratio within the range from 1:1 to 5:1, said diol having a boiling point higher than that of by-product $R^2OH$; removing $R^2OH$ as formed and discontinuing the condensation when substantially all evolution of the $R^2OH$ has ceased, and thereafter cross-linking said intermediate polyester by heating said polyester to temperatures of from about 125° C. to 275° C. thereby forming a resinous cross-linked polyester characterized by insolubility in benzene, acetone and dioxane.

3. Process for the production of resinous cross-linked polyesters, which comprises forming a polyester intermediate characterized by solubility in benzene, acetone, and dioxane by heating and condensing at temperatures within the range between about 125° C. and 275° C. (1) a spirobi(meta-dioxane) compound having the structure:

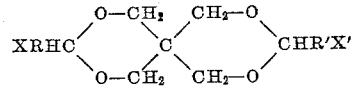

wherein R and R' are members of the class consisting of the divalent aliphatic radicals of the formula $C_nH_{2n}$ wherein $n$ is an integer from 2 to 18, and the divalent cyclohexane group; and X and X' are —$COOR^2$ radicals wherein $R^2$ designates a member of the class consisting of hydrogen and the alkyl radicals having one to fourteen carbon atoms; and (2) an alkanediol having two to ten carbon atoms and having two secondary hydroxyl radicals, the said diol and spirobi(meta-dioxane) compound being reacted in the molar ratio within the range from 1:1 to 5:1, said diol having a boiling point higher than that of by-product $R^2OH$; removing $R^2OH$ as formed and discontinuing the condensation when substantially all evolution of the $R^2OH$ has ceased, and thereafter cross-linking said intermediate polyester by heating said polyester to temperatures of from about 125° C. to 275° C. thereby forming a resinous cross-linked polyester characterized by insolubility in benzene, acetone and dioxane.

4. Process for the production of resinous cross-linked polyesters, which comprises forming a polyester intermediate characterized by solubility in benzene, acetone, and dioxane by heating and condensing at temperatures within the range between about 125° C. and 275° C. (1) a spirobi(meta-dioxane) compound having the structure:

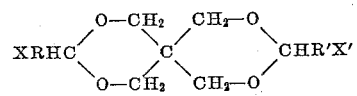

wherein R and R' are members of the class consisting of the divalent aliphatic radicals of the formula $C_nH_{2n}$ wherein $n$ is an integer from 2 to 18, and the divalent cyclohexane group; and X and X' are —$COOR^2$ radicals wherein $R^2$ designates a member of the class consisting of hydrogen and the alkyl radicals having one to fourteen carbon atoms; and (2) an alkanediol having two to ten carbon atoms and having one primary and one secondary hydroxyl radical; the said diol and spirobi(meta-dioxane) compound being reacted in the molar ratio within the range from 1:1 to 5:1, said diol having a boiling point higher than that of by-product $R^2OH$; removing $R^2OH$ as formed and discontinuing the condensation when substantially all evolution of the $R^2OH$ has ceased, and thereafter cross-linking said intermediate polyester by heating said polyester to temperatures of from about 125° C. to 275° C. thereby forming a resinous cross-linked polyester characterized by insolubility in benzene, acetone and dioxane.

5. Process as defined in claim 1 wherein the said diol reactant is ethylene glycol.

6. Process as defined in claim 1 wherein the said diol reactant is diethylene glycol.

7. Process as defined in claim 1 wherein the said diol reactant is 1,6-hexanediol.

8. A resinous cross-linked polyester produced by the process of claim 1.

9. A polymeric polyester of reactants consisting essentially of (1) a compound of the structure

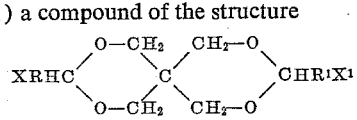

wherein R and $R^1$ are divalent hydrocarbon radicals selected from the group consisting of ethylene and propylene and X and $X^1$ are —$COOR^2$ radicals wherein $R^2$ designates a member of the group consisting of hydrogen, methyl radical and ethyl radical and (2) ethylene glycol.

10. A polymeric polyester consisting essentially of recurring units of the structure:

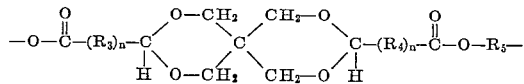

wherein $R_3$, $R_4$, and $R_5$ are alkylene radicals, and $n$ is an integer from zero to one.

References Cited by the Examiner
UNITED STATES PATENTS

| | | | |
|---|---|---|---|
| 2,389,662 | 11/1945 | Fisher | 260—63 |
| 2,437,046 | 3/1948 | Rothrock | 260—75 |
| 2,500,155 | 3/1950 | Croxall et al. | 260—340.7 |
| 3,020,263 | 2/1962 | Foster | 260—67 |

WILLIAM H. SHORT, *Primary Examiner.*

MILTON STERMAN, PHILIP E. MANGAN, HAROLD E. BURSTEIN, JOSEPH R. LIBERMAN, LOUISE P. QUAST, *Assistant Examiners.*